United States Patent
Lee et al.

(10) Patent No.: US 10,831,252 B2
(45) Date of Patent: Nov. 10, 2020

(54) POWER EFFICIENCY-AWARE NODE COMPONENT ASSEMBLY

(71) Applicant: International Business Machines Corporation, Armonk, NY (US)

(72) Inventors: Eun Kyung Lee, Elmsford, NY (US); Bilge Acun, Urbana, IL (US); Yoonho Park, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 15/658,494

(22) Filed: Jul. 25, 2017

(65) Prior Publication Data

US 2019/0033944 A1   Jan. 31, 2019

(51) Int. Cl.
*G06F 1/32* (2019.01)
*G06F 1/3206* (2019.01)
(Continued)

(52) U.S. Cl.
CPC .............. *G06F 1/3206* (2013.01); *G06F 1/32* (2013.01); *G06F 1/3243* (2013.01);
(Continued)

(58) Field of Classification Search
CPC .................................................... G06F 1/3206
See application file for complete search history.

(56) References Cited

U.S. PATENT DOCUMENTS 7,206,828 B1 *  4/2007  Bourke-Dunphy ........................ G06F 9/44505 709/221
2002/0188514 A1 * 12/2002  Kritt ................... G06Q 10/087 705/23

(Continued)

FOREIGN PATENT DOCUMENTS

| WO | 2010114439 A1 | 10/2010 |
| WO | 2011000710 A1 | 1/2011 |
| WO | 2014004132 A1 | 1/2014 |

OTHER PUBLICATIONS

Liu et al., "Scheme for High Power Supply Efficiency of WSN Node", The Ninth International Conference on Electronic Measurement & Instruments, ICEMI'2009, © 2009 IEEE, 4 pages.

(Continued)

*Primary Examiner* — Kim Huynh
*Assistant Examiner* — Eric Chang
(74) *Attorney, Agent, or Firm* — Edward J. Wixted, III

(57) ABSTRACT

Sub-components assembled into a computer are selected based on sub-component power efficiency levels (for example, low, medium, high) and/or anticipated usage of the computer. Multiple units of each type of sub-component (for example, a CPU) are tested to determine a power efficiency level of each unit. Computers in which sub-component efficiency levels are desired to match an overall computer efficiency level, receive sub-component units of corresponding efficiency level. Computers anticipated to run applications that make intensive use of a given type of sub-component receive the given units having a higher efficiency level. Computers anticipated to run applications that make little use of a given type of sub-component receive a physical unit having a lower efficiency level. Computers anticipated to run a wide variety of applications of no particular usage intensity for a given type of sub-component, receive a unit having an average efficiency level.

20 Claims, 7 Drawing Sheets

(51) Int. Cl.
*G06F 1/3287* (2019.01)
*G06F 1/3296* (2019.01)
*G06F 1/3234* (2019.01)

(52) U.S. Cl.
CPC .......... *G06F 1/3275* (2013.01); *G06F 1/3287* (2013.01); *G06F 1/3296* (2013.01)

(56) References Cited

U.S. PATENT DOCUMENTS

| | | | |
|---|---|---|---|
| 2004/0039561 A1* | 2/2004 | Montano | G06F 9/4411 703/22 |
| 2007/0001807 A1* | 1/2007 | Malone | G06Q 50/04 340/10.1 |
| 2007/0001837 A1* | 1/2007 | Larson | G06K 19/0723 340/539.1 |
| 2009/0300386 A1 | 12/2009 | Archer et al. | |
| 2011/0022870 A1* | 1/2011 | McGrane | G06F 1/3203 713/340 |
| 2015/0248312 A1 | 9/2015 | Brochard et al. | |
| 2015/0346753 A1 | 12/2015 | Gan et al. | |
| 2016/0054783 A1 | 2/2016 | Rajappa et al. | |
| 2016/0077539 A1 | 3/2016 | Lee et al. | |
| 2017/0099210 A1 | 4/2017 | Fardid et al. | |
| 2017/0280459 A1* | 9/2017 | Ogrinz | H04W 76/10 |

OTHER PUBLICATIONS

Min et al., "An Architecture for a Power-Aware Distributed Mirosensor Node", Department of Electrical Engineering, Massachusetts Institute of Technology, Cambridge, MA, © 2000 IEEE, 10 pages.

\* cited by examiner

POWER EFFICIENCY-AWARE NODE COMPONENT ASSEMBLY

BACKGROUND OF THE INVENTION

The present invention relates generally to the field of data center operating efficiency, and more specifically to assembly of compute node hardware in a data center environment.

A compute node comprises certain types of hardware components, for example, central processing units (CPUs), memory modules, storage devices, and the like. Typically, copies of a given component—even identical components—will have at least some variation, with respect to power consumption and efficiency. Furthermore, the overall efficiency in a given node assembly depends on the efficiencies of the individual components making up the assembly and the workloads placed on the components during operation.

SUMMARY

According to an aspect of the present invention, there is a method, computer program product and/or system that performs the following operations (not necessarily in the following order): (i) receiving a component efficiency dataset that includes component efficiency information pertaining to a plurality of computer components of a given type; (ii) receiving a component requirements profile corresponding to a computer application where the component requirements profile includes information indicative of a plurality of workload levels imposed by the computer application on a respectively corresponding plurality of sub-components; (iii) selecting, from the plurality of computer components, and for installation into a computer assembly, a selected computer component, the selection based at least in part on information in the component efficiency dataset and the component requirements profile; (iv) producing a computer assembly specification; and (v) sending the computer assembly specification to an assembly workstation interface. The selected computer component has a first efficiency metric.

DETAILED DESCRIPTION

Figure 1:
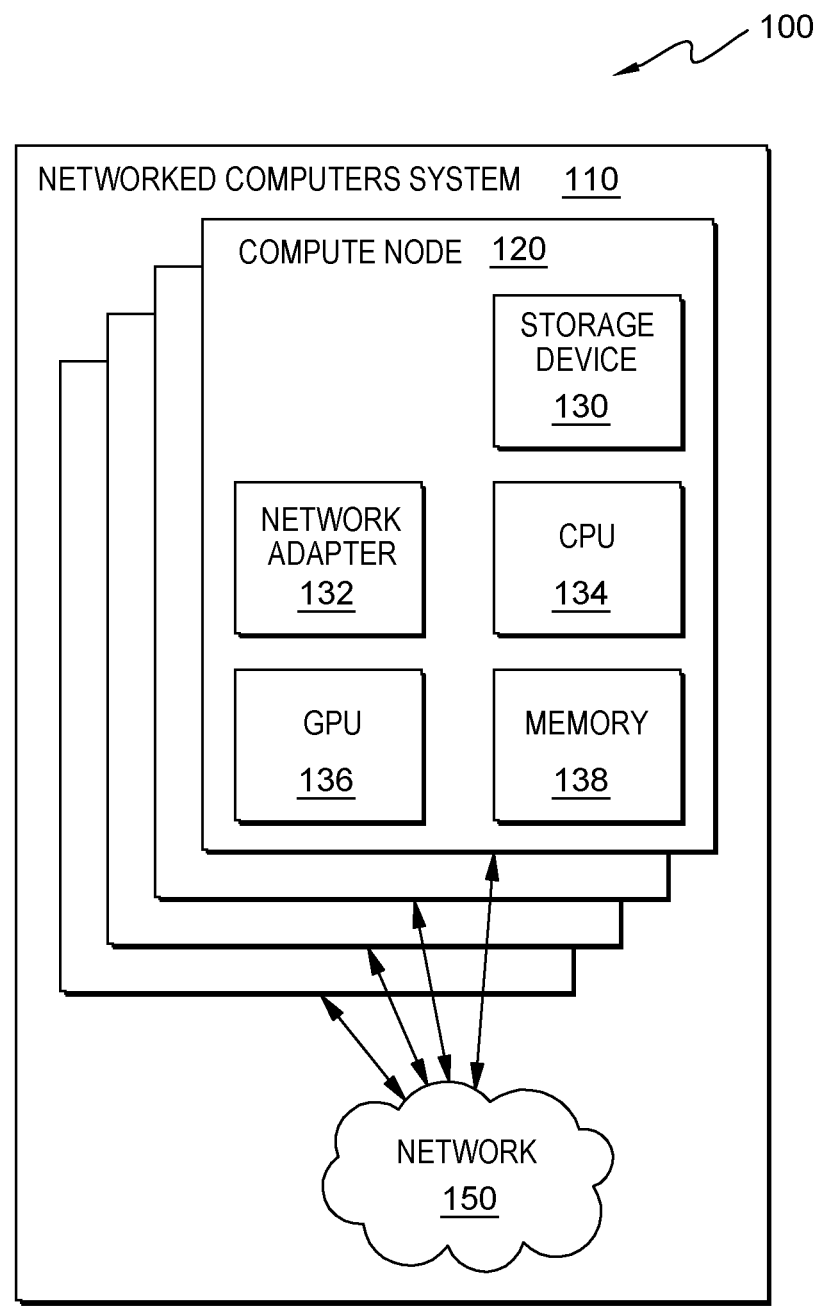
FIG. 1 is a functional block diagram depicting a computing environment in accordance with at least one embodiment of the present invention.

In some embodiments of the present invention, compute nodes (computers or servers in a data center for example) are assembled from components selected according to the power efficiencies of the components. There are various strategies for selecting components that satisfy various efficiency objectives of the compute nodes being assembled. First, the power efficiencies of a pool of components (for example a pool of CPUs) is determined. Some CPUs naturally will exhibit higher efficiencies than others. Other hardware components (for example, memory modules, graphics processors (GPUs), accelerators, etc.) are known to exhibit similar behavior wherein some components will have higher efficiencies (lower power consumption) relative to others, under specified operating conditions. Some sources of this variation are manufacturing related. For example, in complementary metal oxide semiconductor (CMOS) very-large-scale integration (VLSI) processing, manufacturing related variability may cause variations in gate delays and leakage current.

Next, a component requirement profile is determined for each type of application anticipated to be run on a given compute node assembly. The component requirement profile lays out the workload (for example a duty cycle, and/or other characterizations) that will be imposed on each sub-component of a compute node by each type of application anticipated to run on the node. For example, a video editing application may place a heavy workload on a graphics processing unit (GPU) and memory modules, whereas a Monte Carlo simulation application may place a heavy workload on a central processor unit (CPU) and memory modules.

A compute node anticipated to run certain applications is then assembled from components that are selected based at least in part on the component requirement profiles of the anticipated applications. For example, if a compute node is anticipated primarily to run applications that impose a heavy CPU workload, a heavy memory workload, a light GPU workload and a light network adapter workload, the compute node is assembled with high efficiency CPU(s) and GPU(s), and low efficiency memory modules and network adapter. This, and other node assembly strategies, are discussed in more detail below, with respect to FIGS. 4A, 4B, 4C, and 4D under the sub-heading Node assembly strategies.

A component requirements profile will be illustrated by way of example. In this example, a 3-dimensional mechanical drafting application is expected to impose heavy workloads on graphics processor(s) and random access memory (RAM). The application places little workload on a network adapter, and moderate workload on the CPU and local storage (flash drives). The component requirements profile therefore includes information indicating that compared respectively to all components that are available for assembly into a given computer: (i) the GPU(s) and memory modules should have high efficiencies; (ii) the network adapter should have low efficiency; and (iii) the CPU and flash drives should have average efficiency.

At least some of the embodiments disclosed herein recognize that in a data center, nodes are typically assembled from components without regard to the power efficiency of each individual component. For example, in an actual lot of several compute node assemblies, made up (without regard to individual efficiency characteristics) of equivalent sub-components, where the compute node assemblies are configured alike and running the same workload under the same operating conditions, power consumption was observed to vary significantly. Further, the resultant power efficiency characteristics of nodes running under various operating conditions therefore may not be optimized, for any particular type of application.

Note: the terms "compute node", "node", "computer", "server", and similar terms, are synonymous and used interchangeably herein.

Some embodiments of the present invention may include one, or more, of the following features, characteristics and/or advantages with respect to power variation aware node assembly: (i) improved compute node performance; (ii) avoidance of frequency throttle-down due to power usage reaching total design power (TDP or "power cap") of a sub-component or the node overall; (iii) considers sub-component power efficiencies when selecting a particular compute node for running a particular application; and/or (iv) reduces power (rate of energy consumption). The term "power" as used herein, refers to a rate of energy dissipation with respect to time. The term "power efficiency" or the like, as used herein, generally refers to the power dissipated under specified operating conditions, for instance in performing a given workload. For example, power efficiency of a memory module may be characterized in terms the power dissipated in performing a specified level of data transfer. The power efficiency of a processor may be characterized in terms of power consumption (Watts) per gigaFLOP (billions of floating operations per second).

The present invention will now be described in detail with reference to the Figures.

FIG. 1 is a functional block diagram depicting computing environment 100 in accordance with an embodiment of the present invention. Computing environment 100 includes: networked computers system 110; a plurality of compute nodes, including compute node 120; and network 150. Compute node 120 includes zero, one, or more of each of the following types of hardware sub-components: storage device 130; network adapter 132; central processing unit (CPU) 134; graphics processing unit (GPU) 136; and memory module 138.

Compute node 120 can be any of a desktop computer, a laptop computer, a specialized computer server, or any other computer system known in the art. Storage device 130 can be any combination of a hard disk, a solid-state drive, an optical drive, or any other type of persistent storage device. Network adapter 132 may include any combination of wired, wireless, or optical fiber attached interface, capable of passing communications between compute node 120 and network 150. In general, compute node 120 may include some or all of the aforementioned sub-components, as well as other sub-components not shown.

In some embodiments, networked computers system 110 represents a computer system utilizing clustered computers and components to act as a single pool of seamless resources when accessed through network 150. In general, networked computers system 110 is representative of any electronic device, or combination of electronic devices, capable of executing machine-readable program instructions, as described in greater detail below with respect to FIG. 5.

Each sub-component (CPU, GPU, memory, etc.) has a characteristic power efficiency metric and a total design power (TDP) or a custom power cap. The TDP or power cap specifies maximum power rating of the sub-component. A compute node may also have a TDP as well, which is a function at least of the included components and the thermal management system (cooling system). In some embodiments of the present invention, an algorithm considers variations in power consumption and efficiency of each hardware sub-component, in selecting particular sub-components for assembly into a node.

It is well known that any group of manufactured devices, while intended and manufactured to be identical with one another, will nevertheless have variations, from unit to unit, in any given measureable characteristic. For example, in a group of central processing unit (CPU) chips, one measureable characteristic is the power consumed by each chip when operating under a given set of operating conditions.

With sufficiently large test samples (CPUs or GPUs, for example), the distribution of power consumption is expected to approach a normal (Gaussian) frequency distribution (based on the "central limit theorem" in the field of probability theory). However, the frequency distributions among different hardware components, including processors, may differ for each hardware component, as may also be the case for total power of a node into which a variety of sub-components are assembled. The total power consumption of a node is the sum of the individual power consumptions of all the included power-consuming sub-components that make up the node.

Due to typical differences in power consumption discussed above, some embodiments of the present invention use various strategies to select sub-components for assembly into a compute node. In some embodiments, selection strategies are based on a component requirements profile corresponding to one or more computer applications that are anticipated to run on the compute node. A component requirements profile includes information indicative of the intensity of workloads the application imposes on various components of a computer running the application. Some selection strategies will be discussed below, with reference to FIGS. 4A, 4B, 4C and 4D.

Figure 2:
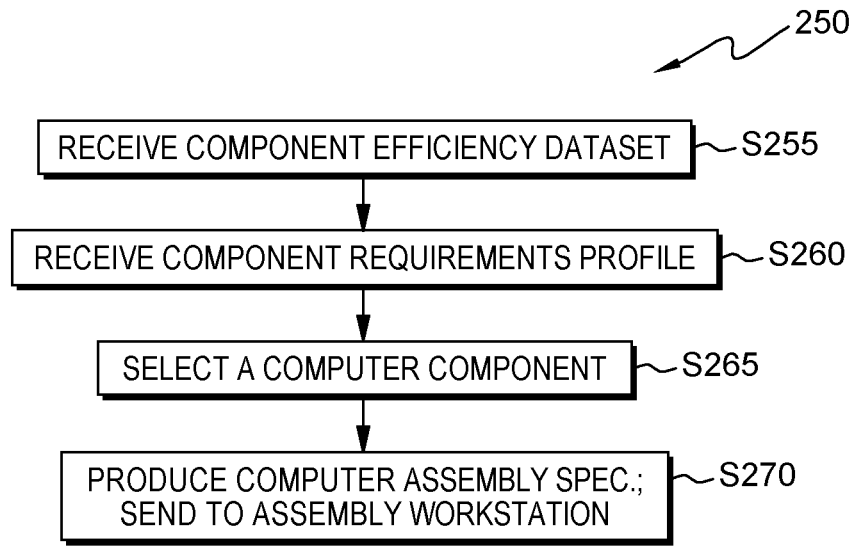
FIG. 2 is a flowchart showing a computer component selection method in accordance with at least one embodiment of the present invention.
Figure 3:
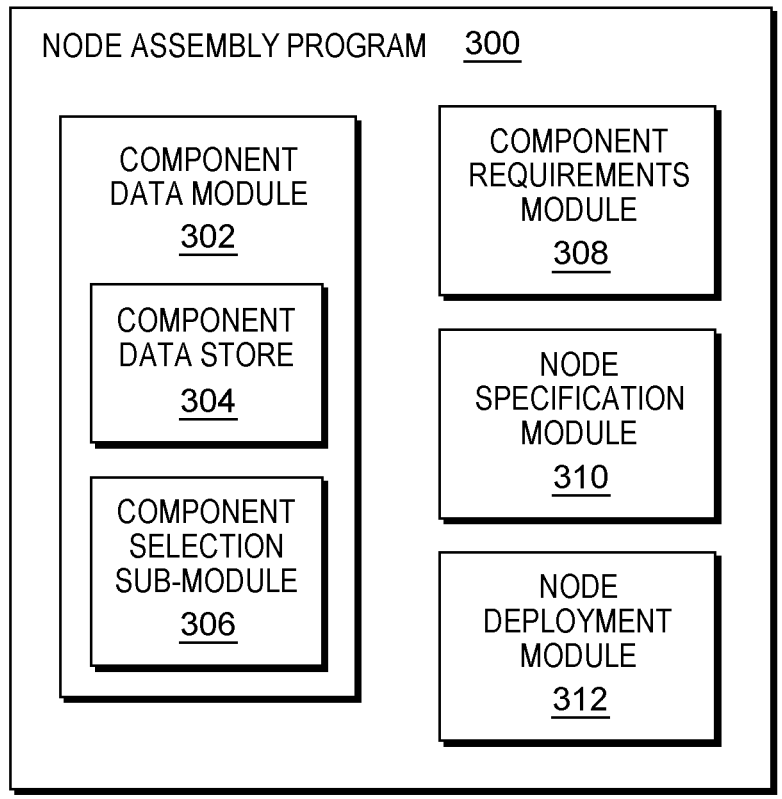
FIG. 3 is a block diagram showing a machine logic for performing a computer component selection method in accordance with at least one embodiment of the present invention.

FIG. 2 shows flowchart 250 depicting a method according to the present invention. FIG. 3 shows node assembly program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where component data store 304, of component data module 302, of node assembly program 300 receives a component efficiency dataset that includes information indicating power consumption and efficiency data for a set of compute node sub-components. The set of sub-components includes, for each type of component, multiple interchangeable units, from which one or more (or none) of each type will be selected for assembly into a compute node (see compute node 120, and various types of sub-components included therein, of FIG. 1). For example, the sub-components may include multiple central processing units (CPUs) such as CPU 134 (FIG. 1) multiple memory modules 138, etc. The component efficiency dataset includes comparative efficiency data for each of the sub-components, operating under a variety of specified operating conditions.

Processing proceeds at operation S260 where component requirements module 308 of node assembly program 300 receives a component requirements profile. The component requirements profile specifies anticipated workloads respectively imposed on computer sub-components by operation of a particular computer application.

Processing proceeds to operation S265, where component selection sub-module 306 selects from among a plurality of components, certain individual components based on the component efficiency dataset received in operation S255 and the resource requirements profile received at operation S260.

In an example embodiment, the resource requirements profile indicates that a computer application will impose the following respective workloads on components of a compute node: (i) the CPUs, RAM modules, and flash drives, will all be heavily loaded; and (ii) the GPU is lightly loaded (in fact, not used at all). Based on this information, component selection sub-module 306 selects components with the following efficiency characteristics for assembly into the compute node: (i) "high efficiency" CPUs, RAM modules, and flash drives; and (ii) "low efficiency" GPU.

Processing proceeds at operation S270 where node specification module 310 of node assembly program 300, produces a computer assembly specification, based on the component selections made at operation S265. The computer assembly specification uniquely identifies a physical computer and uniquely identifies each individual sub-component that has been determined to be assembled into the computer. The node assembly program sends the computer assembly specification to an assembly workstation (not shown in the Figures).

In some embodiments of the present invention, node specification module 310, interfaces with automated machinery to retrieve the selected sub-components from physical storage or stocking locations, and delivers them to a computer assembly workstation. In some embodiments, the node specification module further interfaces with automated assembly machinery that automatically assembles the sub-components into the computer. In other embodiments, the node specification module interfaces with an assembly technician through a user interface, to deliver information as to which particular sub-component(s) are to be placed in a given computer. In still other embodiments, computer assembly is accomplished through a combination of automated machinery and human action.

In some embodiments of the present invention, once a node assembly is complete, the node specification module verifies inclusion of the selected sub-components (and exclusion of non-selected components) within the completed node assembly, for example by using (singly, or in any combination) machine vision, radio frequency identification (RFID) technology, retrieval (for example, during node assembly test) of ID information encoded in read-only-memory (ROM) chips in the various sub-components, etc.

In some embodiments of the present invention, compute node deployment module 312 determines the physical placement of an assembled compute node within a computing facility. For example, in a datacenter that has multiple types of nodes, nodes of a given type may be placed near each other, for example in a contiguous series of racks, or all contiguously within a single rack, or in any other way such that they are physically (and operationally) close together.

By way of illustration, consider a graphics-intensive application that uses multiple graphics-optimized nodes in parallel. By deploying a series of graphics-optimized nodes contiguously with one another, a topology aware job placement scheduler can schedule the application to run on those contiguous nodes thereby minimizing the network/communication costs (network overhead) of running the application and thereby maximizing the performance of the nodes. Parallel applications can run in the same or similar fashion on those nodes and reduce costs posed by any application imbalance.

Node Assembly Strategies.

Some node assembly strategies will now be discussed, with respect to FIGS. 4A through 4D, in which computer sub-components [CPU: memory: GPU] are respectively represented by the symbols [circle: triangle: square]. A given compute node assembly is represented by a rectangle enclosing a set of sub-components (for example compute node 401 of FIG. 4A). The power efficiency of each sub-component is represented (herein, on an arbitrary scale) by a number (1—least efficient, through 5—most efficient) within the symbol representing the sub-component.

Figure 4A:
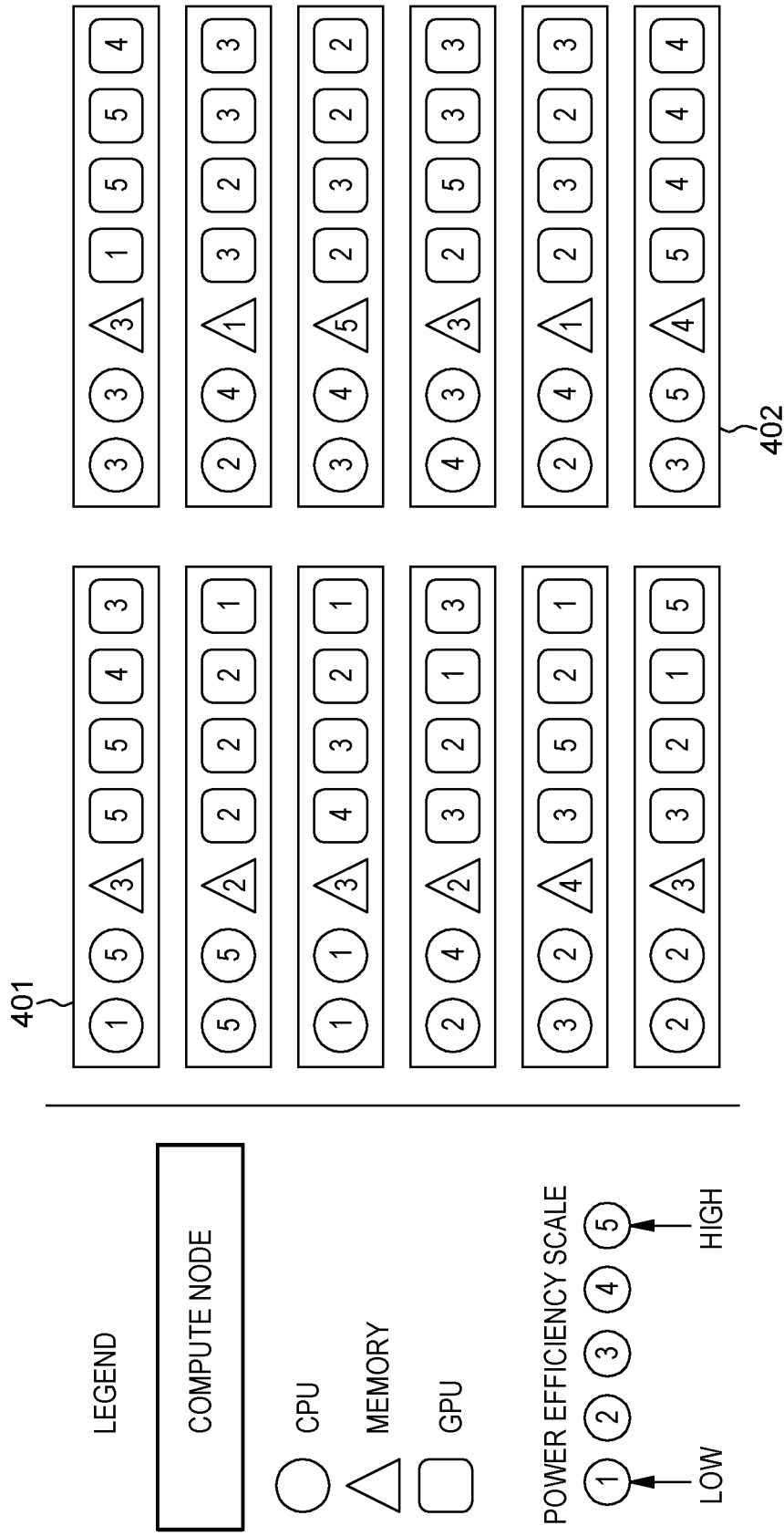
FIG. 4A is a computer component block diagram showing a plurality of computer assembly configurations in accordance with at least one embodiment of the present invention.

FIG. 4A shows assembly results of 12 hypothetical node assemblies, where the sub-components going into each node are selected at random, with respect to their power efficiencies. For instance, compute node 401 is assembled with: a low-efficiency CPU (1); a high-efficiency CPU (5); a mid-efficiency memory module (3); two high-efficiency GPUs (5); a mid-high-efficiency GPU (4); and a mid-efficiency GPU (3).

As described by the central limit theorem in the field of statistics, a sufficiently large group of nodes, where the sub-components in each node are chosen at random, the resultant power efficiencies of the nodes in the group can be expected to approximate a normal (Gaussian) frequency distribution.

In some embodiments of the present invention, individual sub-component units are uniquely identified by part number and serial number. Manufacturers and/or testers (not shown in the Figures) of the various sub-components determine power efficiency metrics for each unit, and send the corresponding data to component data module 302, of node assembly program 300 (FIG. 3). The data includes at least real time task and energy profiling data collected under specified operating conditions. In some embodiments, this data is collected during manufacture and/or test of each sub-component unit. Each unit is labeled or otherwise made identifiable, for example by application of radio frequency identification (RFID) tags, or identifying information written to read only memory (ROM, PROM, EPROM, etc.) chips on the unit. Component data store 304 stores the classifications of the individual sub-components. The classifications (sometimes herein referred to as rankings, or grades) are established at a pre-defined level of granularity. For example, in some embodiments, a course level of granularity classifies modules as either "low efficiency", "average efficiency", or "high efficiency", whereas in some embodiments, a finer level of granularity classifies modules, for instance, into quintiles, or octiles.

Note that references herein to "low efficiency", "high efficiency" and the like, refer to the power efficiency for a given component relative to the power efficiencies among a plurality of that component. By way of example, suppose there are 1000 dual inline memory modules (DIMMs) in a production lot. Each individual DIMM is determined to have a certain power efficiency. Each DIMM ranks somewhere between the lowest observed efficiency and the highest observed efficiency (inclusive), among all the DIMMs in that production lot. Characterization of a unit's efficiency as "low" or "high", as these terms are used herein, implies neither any degree of quality, nor any degree of "badness" or "goodness"—the terms merely state the relative ranking of a given unit's efficiency within an arbitrary group of equivalent units (in this example, a production lot).

Node Sub-Component Non-Random Selection Methods.

In some embodiments of the present invention, there are at least three types of non-random power variation aware node assembly strategies in accordance with embodiments of the present invention: Type 1—similarly ranked sub-components are assembled within a node (refer to FIG. 4B); Type 2—sub-components are selected based on application-specific needs and characteristics (refer to FIG. 4C); and Type 3—sub-components are selected based on a balanced power efficiency (refer to FIG. 4D). These three types will be explained in the following few paragraphs. Notwithstanding the three types discussed herein, there may be further types of selection methods, not herein delineated, that nevertheless are in keeping with the spirit of the present invention.

Type 1—sub-components are similarly ranked.

Figure 4B:
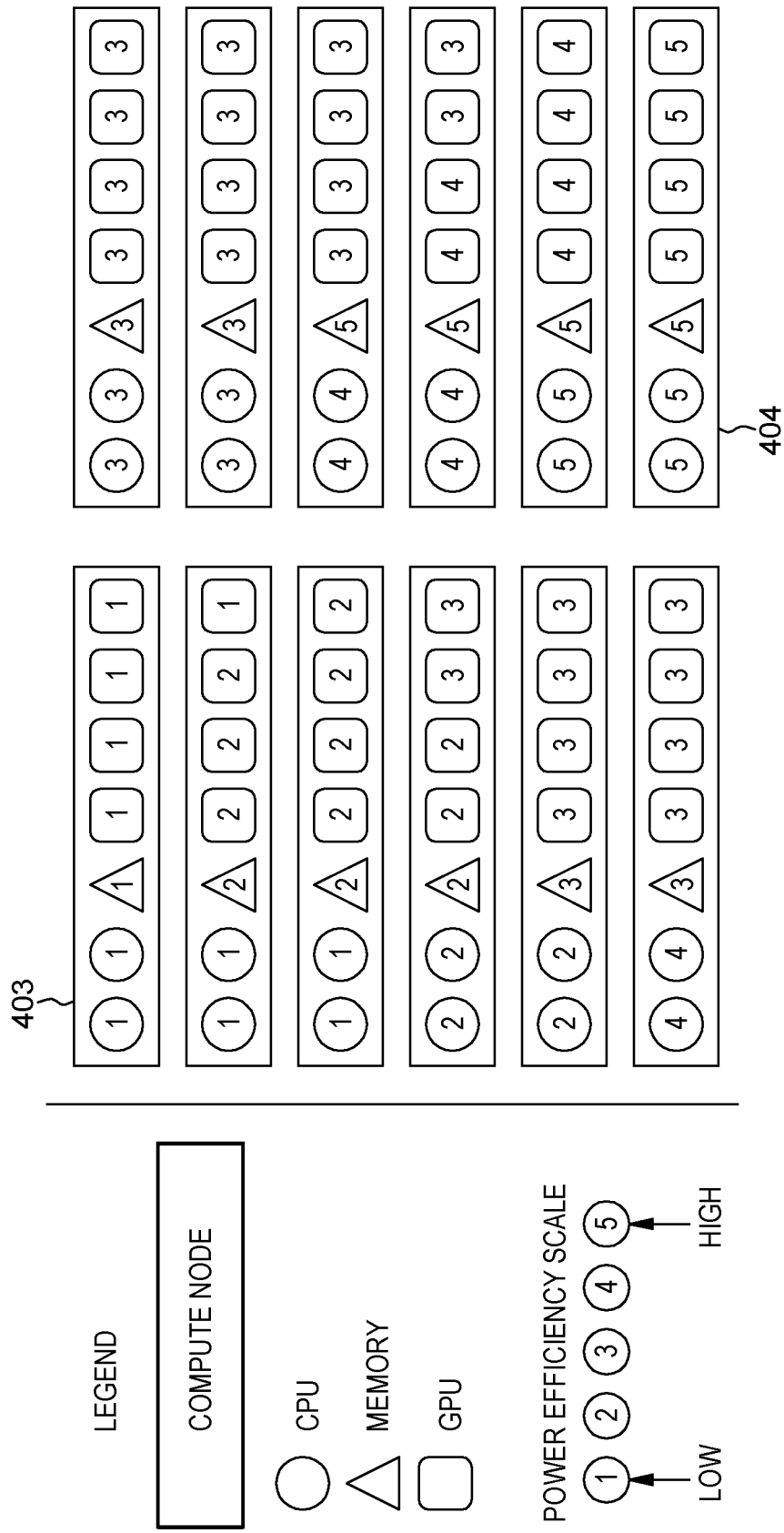
FIG. 4B is a block diagram showing a plurality of Type 1 computer assembly configurations in accordance with at least one embodiment of the present invention.

FIG. 4B illustrates Type 1 sub-component selection, in some embodiments of the present invention. Component requirements module 308, of node assembly program 300 (FIG. 3) stipulates that a given node is to be assembled from sub-components of similar ranking as to power efficiency. Component selection sub-module 306, with reference to component data store 304, selects sub-components that meet the node objective. Sub-components going into each node are selected to have similar levels of power efficiency. For example, node 403 is assembled with all sub-components ranked with low levels of power efficiency. In contrast, node 404 is assembled with all sub-components ranked with high levels of power efficiency. Each of the other nodes is assembled using sub-components having similar power efficiencies between the lowest and highest levels of efficiency.

Some embodiments of the present invention using Type 1 node assembly may include one or more of the following features, characteristics and/or advantages: (i) the most efficient sub-components are assembled together into nodes to create generally efficient nodes; (ii) the least efficient sub-components are assembled together into nodes of lesser general efficiency; (iii) nodes are ranked in terms of their general efficiency; (iv) nodes will comprise sub-components all having similar efficiencies; and/or (v) permits a data center that is not 100% utilized, to selectively use efficient nodes first, and turn-off the inefficient nodes when not needed, to improve overall data center efficiency.

Further with respect to item (iii) in the paragraph above, in some embodiments, Type-1 nodes may be sold at different price points based on node efficiency configuration. Customers having a limited power allocation, for example where the power infrastructure of a building allows a limited amount of draw, may have an option to buy only efficient nodes with a corresponding cost of more expensive hardware. Alternatively, where customers that do not have such a power limitation, but where hardware cost significantly contributes to the total cost of ownership (TCO), a customer may buy nodes of lesser efficiency at correspondingly lower price points.

Type 2—Sub-Components are Ranked According to Application-Specific Needs and Characteristics.

Figure 4C:
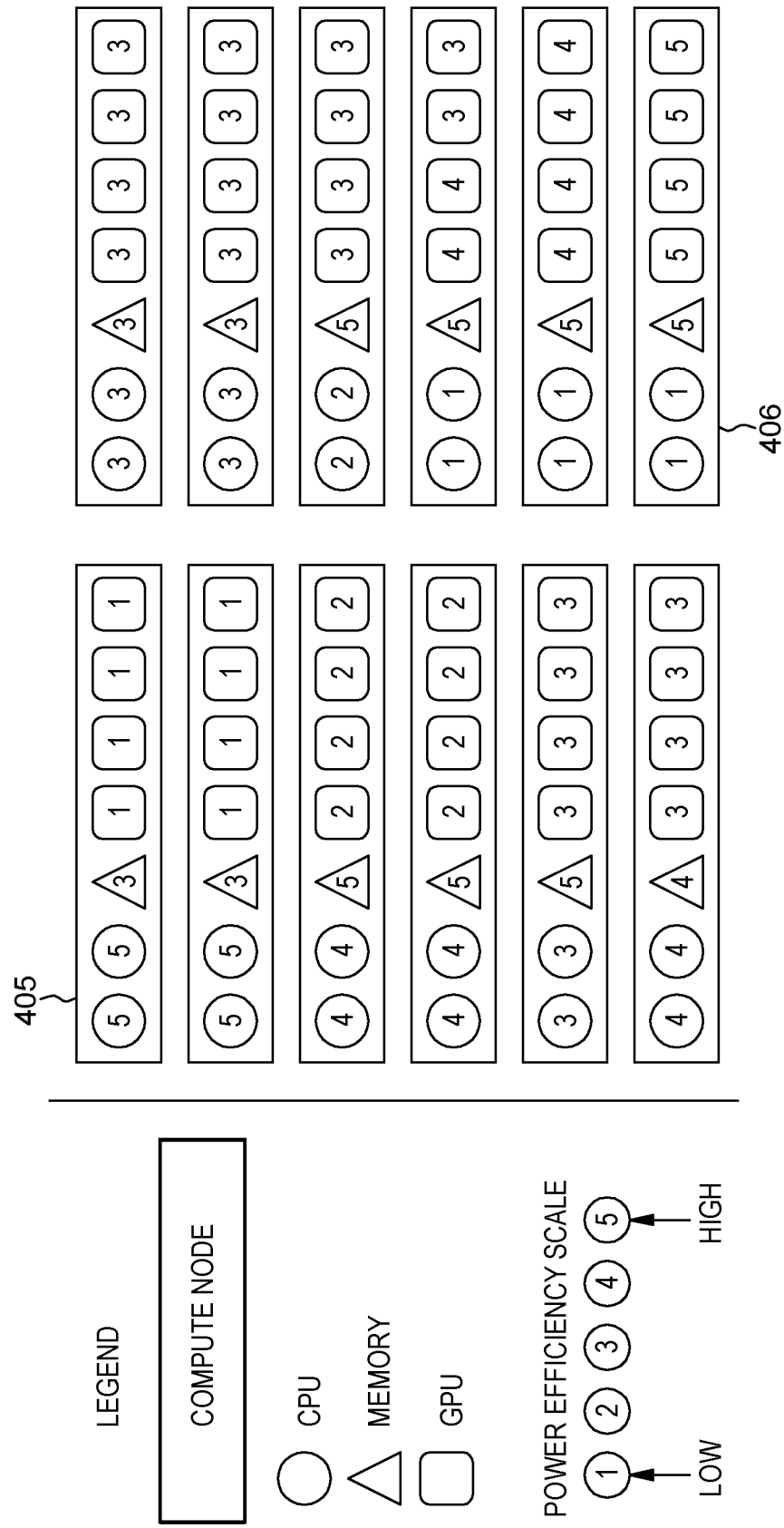
FIG. 4C is a block diagram showing a plurality of Type 2 computer assembly configurations in accordance with at least one embodiment of the present invention.

FIG. 4C illustrates Type 2 sub-component selection in some embodiments of the present invention. Component requirements module 308, of node assembly program 300 (FIG. 3) stipulates that a given node is to be assembled from sub-components selected based on certain characteristics of applications that are projected to run on the nodes. Component selection sub-module 306, with reference to component data store 304, selects sub-components that meet the node objectives. For example: (i) the component selection sub-module selects efficient CPUs for nodes that are anticipated primarily to run CPU intensive applications, and that do not make intensive use of use other components (node 405); (ii) the component selection sub-module selects all sub-components that are ranked as efficient, for nodes that are designated to run applications which make intensive use of all components; and/or (iii) the component selection sub-module selects efficient memory modules for nodes that are designated to run memory intensive applications (node 406), etc. In practice, a job scheduler places (assigns) applications to run on certain nodes based on matching characteristics between the node sub-components and the applications. With this approach, efficient sub-components will be intensively loaded and inefficient ones lightly loaded, increasing the overall efficiency of Type 2 nodes.

Type 3—Sub-Components are Selected for Balanced Power Efficiency Rankings.

Figure 4D:
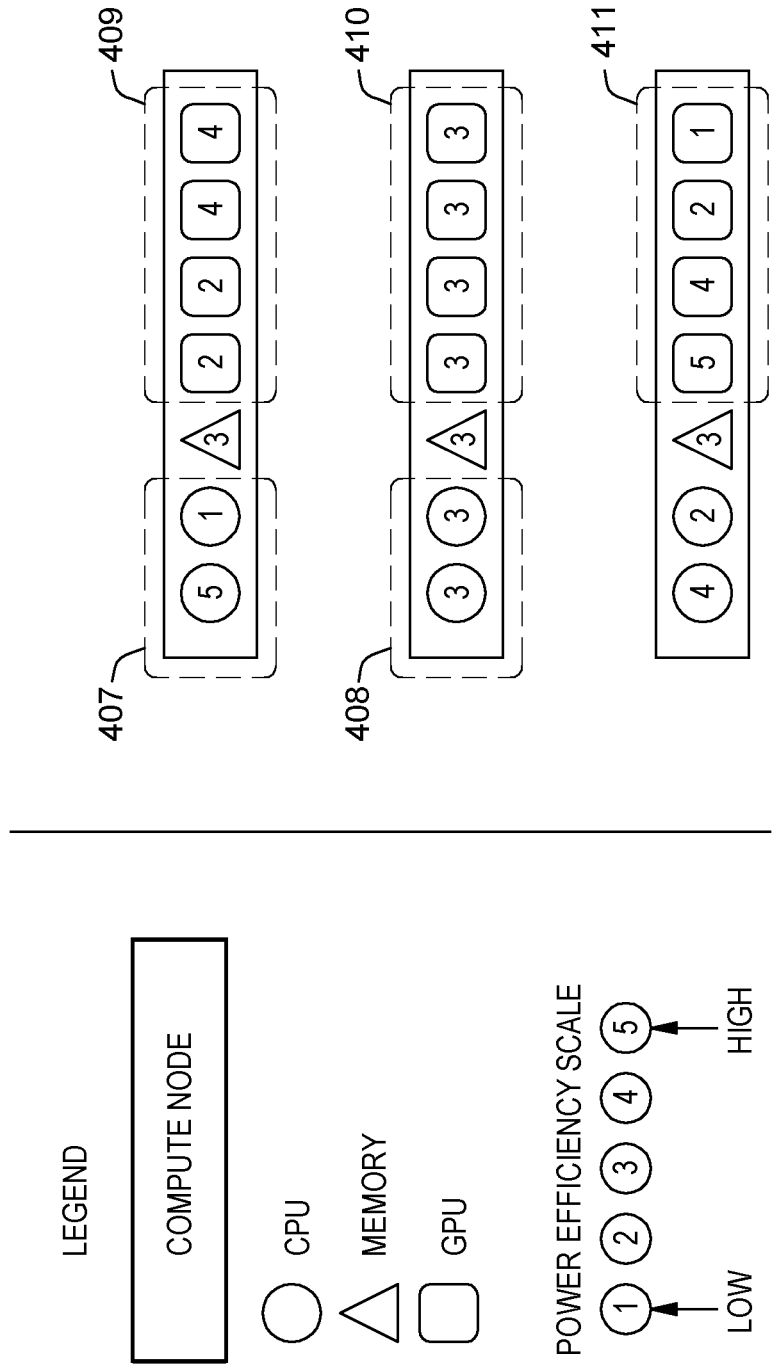
FIG. 4D is a block diagram showing a plurality of Type 3 computer assembly configurations in accordance with at least one embodiment of the present invention.

FIG. 4D illustrates Type 3 sub-component selection. In Type 3 node assembly, component requirements module 308, of node assembly program 300 stipulates the objective for assembling a given node with efficiency-balanced sub-components. Component selection sub-module 306, with reference to component data store 304, selects sub-components that have counterbalancing levels of power efficiency. For example, in the embodiment of FIG. 4D, component selection sub-module pairs a CPU having above average efficiency with a CPU having below average efficiency (407) (or two CPUs both having average efficiency (408)). In both cases, the two CPUs working together overall, will have approximately average efficiency. Similar rationale is used for selecting other sub-components, for example GPUs, such that in aggregate, the GPUs perform with average efficiency overall (409, 410, and 411). Consequences of Type 3 assembly include: (i) each node performs with average efficiency; (ii) efficiency variability between nodes is minimal; (iii) node-level power variations are minimal; (iv) node-level power variations are more predictable compared to random assembly, and assemblies of Type 1 and Type 2; and/or (v) the placement among nodes of application jobs is not affected, meaning there is little variation (in terms of efficiency) among nodes, regardless of which types applications are run on the nodes.

Some embodiments of the present invention may include one, or more, of the following features, characteristics and/or advantages: (i) each sub-component unit is ranked in terms of its power consumption and efficiency; (ii) a node assembly algorithm considers variation in power consumption and efficiency of each sub-component unit when selecting certain units for assembly into a node; (iii) uses a power efficiency aware assembly technique when selecting node sub-components; (iv) uses a power variation aware assembly technique when selecting node sub-components; (v) deploys similar or same node types physically near each other in a computing environment (such as a rack, a contiguous series of racks, a data center, etc.); (vi) allocates nodes to applications based on node and application characteristics; (vii) assembles nodes during the machine installation phase; (viii) characterizes each sub-component of a node; (ix) selects certain sub-components for assembly into a node based on the characterizations of the sub-components; (x) collects power efficiency information of sub-components before assembly into nodes; (xi) assembles nodes in a power-variation aware fashion where hardware is selected based on this variation; (xii) uses one of at least three different assembly types described above in the section "Node Sub-Component selection methods"; (xiii) sorts (ranks, classifies, or grades) sub-components with respect to power variation (and/or power efficiency variation); (xix) assembles different nodes to meet different goals, made possible because a node includes multiple sub-components that behave differently (that is, the sub-components have different rankings); (xx) assembles a plurality of nodes with a power-variation aware technique; and/or (xxi) if a node experiences a failed sub-component, the sub-component is swapped-out with a replacement one that is ranked (in terms of power efficiency) similarly to the failed one, such that the original assembly objective of the node is maintained. In other words, the replacement sub-component is selected such that the sub-component efficiency matches the failed sub-component efficiency within a threshold tolerance.

Some embodiments of the present invention enable custom pricing based on node type. For example, node pricing can be determined by the power efficiency of the chips. If overall power consumption is an important constraint in a data center, efficient nodes may be more valuable. In contrast, if power consumption is not an important concern, less efficient nodes may offer better value for the price. For cloud systems where applications share compute nodes, balanced node types (for example, Type 3) may be preferred.

Some embodiments may not have potential advantages set forth herein. Further, potential advantages disclosed herein are not necessarily required of all embodiments.

Figure 5:
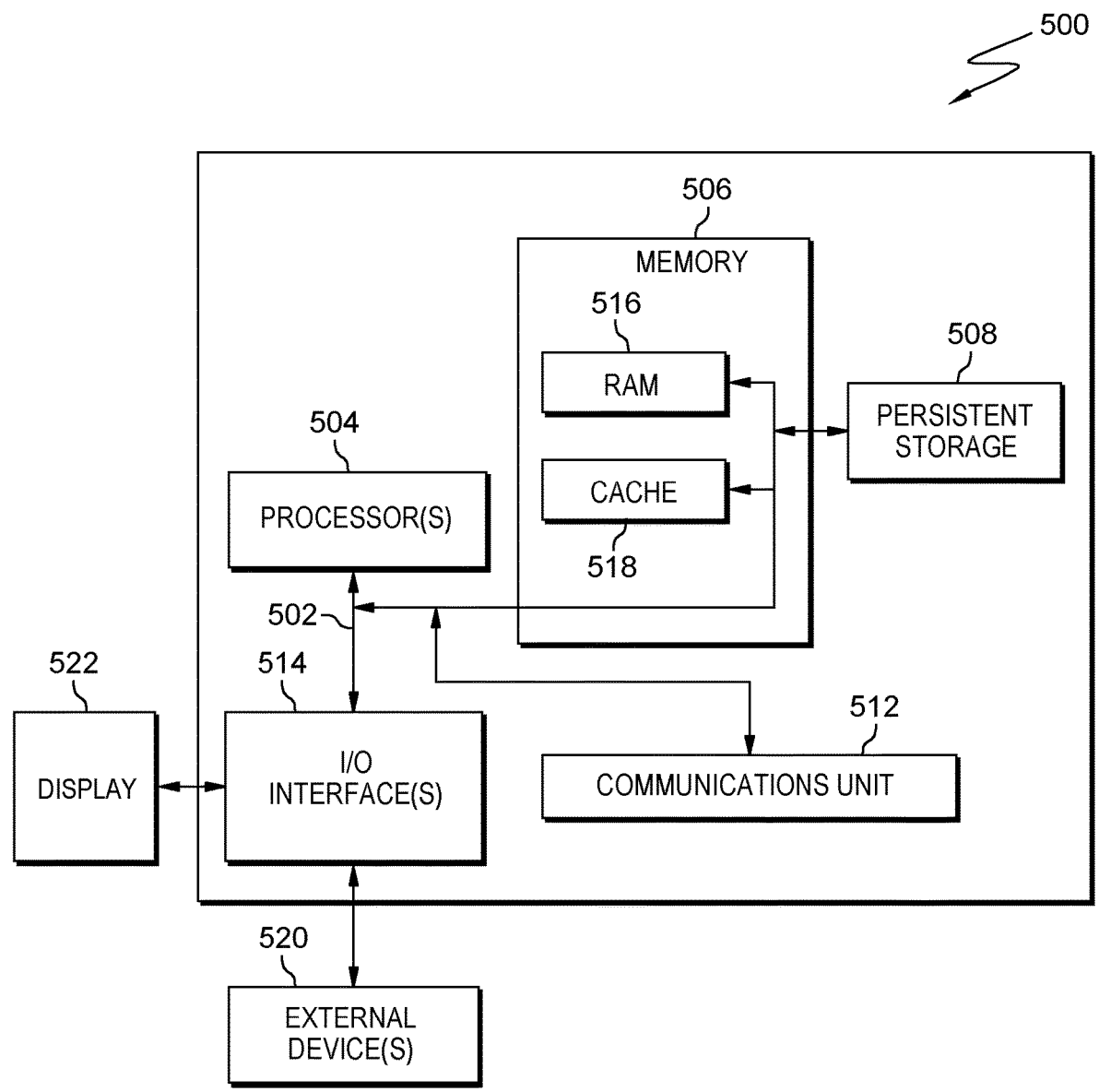
FIG. 5 is a block diagram depicting components of a computer, in accordance with at least one embodiment of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

Definitions

Component, and sub-component: both terms refer to replaceable power consuming or power dissipating units within a computer assembly; both terms are synonymous and herein used interchangeably.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    receiving a component efficiency dataset that includes component efficiency information pertaining to a plurality of computer components of a given type, including a first component and a second component, wherein the component efficiency dataset includes a collective efficiency metric pertaining to the plurality of computer components;
    receiving a component requirements profile corresponding to a computer application;
    determining the first component has a first efficiency metric that is less than the collective efficiency metric;
    determining the second component has a second efficiency metric that is greater than the collective efficiency metric;
    selecting the first component and the second component for installation into a computer assembly;
    producing a computer assembly specification;
    sending the computer assembly specification to an automated assembly workstation interface;
    receiving a completed computer assembly configuration dataset that represents a configuration of an assembled computer;
    automatically verifying information in the completed computer assembly configuration dataset corresponds to information in the computer assembly specification; and
    specifying a physical placement within a computing facility where the assembled computer is to be installed based at least in part on the configuration of the assembled computer.

2. The method of claim 1, wherein the computer assembly specification includes information that: (i) uniquely identifies the computer assembly; and (ii) uniquely identifies the first computer component and the second computer component.

3. The method of claim 1, further comprising:
    determining that the first computer component failed during operation of the computer assembly; and
    in response to determining that the first computer component failed, replacing the first computer component with a replacement computer component having an efficiency metric that matches the first efficiency metric within a threshold tolerance.

4. The method of claim 1, wherein the first efficiency metric includes a rate of energy dissipated by the first computer component while the selected computer component operates under specified operating conditions.

5. The method of claim 1, wherein the component requirement profile includes information indicative of a plurality of workload levels imposed on a respectively corresponding plurality of computer components, including the selected computer component, during execution of the computer application by the computer assembly.

6. The method of claim 1, wherein:
    automatically verifying information in the completed computer assembly configuration dataset corresponds to information in the computer assembly specification comprises using a technique selected from the group consisting of: machine vision, radio frequency identification, and reading identification information encoded in a memory chip.

7. The method of claim 1 wherein the collective efficiency metric comprises an arithmetic mean of a plurality of efficiency metrics respectively pertaining to the plurality of computer components.

8. A computer program product comprising:
    one or more computer readable storage media and program instructions stored on the one or more computer readable storage media, the program instructions comprising instructions to perform:
    receiving a component efficiency dataset that includes component efficiency information pertaining to a plurality of computer components of a given type, including a first component and a second component, wherein the component efficiency dataset includes a collective efficiency metric pertaining to the plurality of computer components;
    receiving a component requirements profile corresponding to a computer application;
    determining the first component has a first efficiency metric that is less than the collective efficiency metric;
    determining the second component has a second efficiency metric that is greater than the collective efficiency metric;
    selecting the first component and the second component for installation into a computer assembly;
    producing a computer assembly specification;
    sending the computer assembly specification to an automated assembly workstation interface;
    receiving a completed computer assembly configuration dataset that represents a configuration of an assembled computer;

automatically verifying information in the completed computer assembly configuration dataset corresponds to information in the computer assembly specification; and specifying a physical placement within a computing facility where the assembled computer is to be installed based at least in part on the configuration of the assembled computer.

9. The computer program product of claim 8, wherein the computer assembly specification includes information that: (i) uniquely identifies the computer assembly; and (ii) uniquely identifies the first computer component and the second computer component.

10. The computer program product of claim 8, further comprising program instructions to perform:

determining that the first computer component failed during operation of the computer assembly; and in response to determining that the first computer component failed, replacing the first computer component with a replacement computer component having an efficiency metric that matches the first efficiency metric within a threshold tolerance.

11. The computer program product of claim 8, wherein the first efficiency metric includes a rate of energy dissipated by the first computer component while the selected computer component operates under specified operating conditions.

12. The computer program product of claim 8, wherein the component requirement profile includes information indicative of a plurality of workload levels imposed on a respectively corresponding plurality of computer components, including the selected computer component, during execution of the computer application by the computer assembly.

13. The computer program product of claim 8, wherein:

automatically verifying information in the completed computer assembly configuration dataset corresponds to information in the computer assembly specification comprises using a technique selected from the group consisting of: machine vision, radio frequency identification, and reading identification information encoded in a memory chip.

14. The computer program product claim 8 wherein the collective efficiency metric comprises an arithmetic mean of a plurality of efficiency metrics respectively pertaining to the plurality of computer components.

15. A computer system comprising:

one or more computer processors;

one or more computer-readable storage media;

program instructions stored on the computer-readable storage media for execution by at least one of the one or more processors, the program instructions comprising instructions to perform:

receiving a component efficiency dataset that includes component efficiency information pertaining to a plurality of computer components of a given type, including a first component and a second component, wherein the component efficiency dataset includes a collective efficiency metric pertaining to the plurality of computer components;

receiving a component requirements profile corresponding to a computer application;

determining the first component has a first efficiency metric that is less than the collective efficiency metric;

determining the second component has a second efficiency metric that is greater than the collective efficiency metric;

selecting the first component and the second component for installation into a computer assembly;

producing a computer assembly specification;

sending the computer assembly specification to an automated assembly workstation interface;

receiving a completed computer assembly configuration dataset that represents a configuration of an assembled computer;

automatically verifying information in the completed computer assembly configuration dataset corresponds to information in the computer assembly specification; and specifying a physical placement within a computing facility where the assembled computer is to be installed based at least in part on the configuration of the assembled computer.

16. The computer system of claim 15, wherein the computer assembly specification includes information that: (i) uniquely identifies the computer assembly;

and (ii) uniquely identifies the first computer component and the second computer component.

17. The computer system of claim 15, further comprising program instructions to perform:

determining that the first computer component failed during operation of the computer assembly; and in response to determining that the first computer component failed, replacing the first computer component with a replacement computer component having an efficiency metric that matches the first efficiency metric within a threshold tolerance.

18. The computer system of claim 15, wherein the first efficiency metric includes a rate of energy dissipated by the first computer component while the selected computer component operates under specified operating conditions.

19. The computer system of claim 15, wherein the component requirement profile includes information indicative of a plurality of workload levels imposed on a respectively corresponding plurality of computer components, including the selected computer component, during execution of the computer application by the computer assembly.

20. The computer system of claim 15, wherein:

automatically verifying information in the completed computer assembly configuration dataset corresponds to information in the computer assembly specification comprises using a technique selected from the group consisting of: machine vision, radio frequency identification, and reading identification information encoded in a memory chip.

* * * * *